(12) United States Patent
Nakagawa et al.

(10) Patent No.: US 7,081,068 B2
(45) Date of Patent: Jul. 25, 2006

(54) TRANSMISSION SYSTEM FOR WORK VEHICLE

(75) Inventors: Tomohiro Nakagawa, Hirakata (JP); Shigeru Yamamoto, Hirakata (JP); Toshikazu Okada, Osaka (JP)

(73) Assignee: Komatsu Ltd. (JP)

( * ) Notice: Subject to any disclaimer, the term of this patent is extended or adjusted under 35 U.S.C. 154(b) by 162 days.

(21) Appl. No.: 10/770,552

(22) Filed: Feb. 4, 2004

(65) Prior Publication Data
US 2004/0157702 A1 Aug. 12, 2004

(30) Foreign Application Priority Data
Feb. 12, 2003 (JP) ............... 2003-034077

(51) Int. Cl.
F16H 61/26 (2006.01)

(52) U.S. Cl. .................... 477/132; 477/135

(58) Field of Classification Search ........... 477/132, 477/135, 139, 140, 144
See application file for complete search history.

(56) References Cited

U.S. PATENT DOCUMENTS

| 5,505,670 A | 4/1996 | Inuzuka et al. | |
|---|---|---|---|
| 5,976,055 A | 11/1999 | Sasaki | |
| 6,066,072 A | 5/2000 | Adachi | |
| 6,319,170 B1 * | 11/2001 | Hubbard et al. | 477/107 |
| 6,554,741 B1 * | 4/2003 | Saito | 477/120 |
| 6,656,087 B1 * | 12/2003 | Runde et al. | 477/107 |

FOREIGN PATENT DOCUMENTS

| JP | 05-229368 A | | 9/1993 | |
|---|---|---|---|---|
| JP | 6-94119 | * | 4/1994 | 477/135 |
| JP | 10-141487 A | | 5/1998 | |
| JP | 2002-188713 A | | 7/2002 | |

* cited by examiner

Primary Examiner—Ha Ho
(74) Attorney, Agent, or Firm—Rader, Fishman & Grauer PLLC

(57) ABSTRACT

A transmission system for a work vehicle, which is capable of reliably mitigating, with relatively simple arrangement, shocks caused by speed changes even in a work vehicle such as a bulldozer in which almost all operations are performed with the engine operating at full load. In the transmission system which converts the output torque of an engine into torque according to work load by operations for shifting speed gears through disengagement/engagement of friction clutches, if a downshift from a higher speed gear to a lower speed gear is effected while the engine operating at full load, the friction clutch controlling valves, controller and friction clutches allows the friction clutch corresponding to the higher speed gear to slide so as to enable power transmission and the engine controlling fuel injection system and controller allows the engine to perform high power operation (overload operation) during the sliding of the friction clutch.

5 Claims, 6 Drawing Sheets

FIG. 2
FIG. 2 (a)
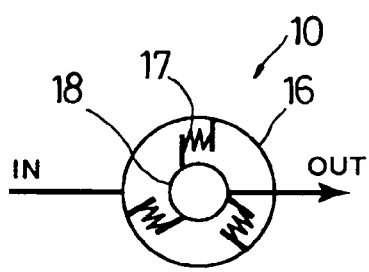
FIG. 2 (b)
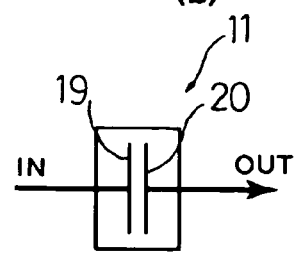
FIG. 2 (c)
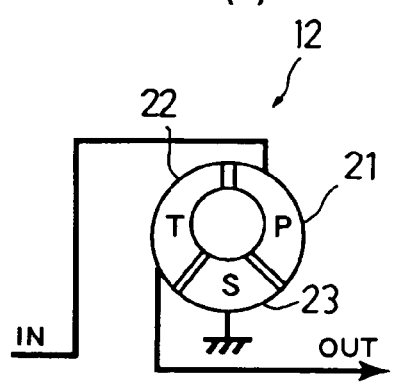
FIG. 2 (d)
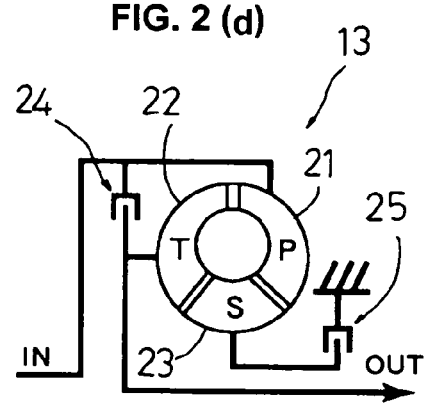
FIG. 2 (e)
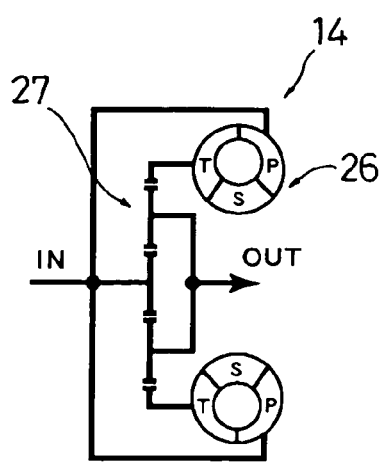
FIG. 2 (f)
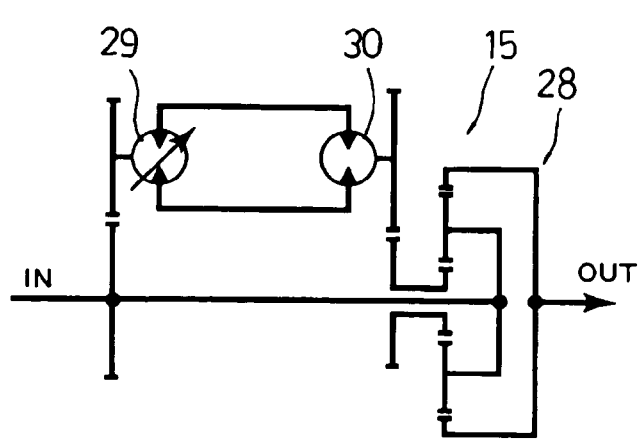

$T_A$: OUTPUT TORQUE CHACRATERISTIC CURVE FOR FULL LOAD OPERATION $T_B$: OUTPUT TOROUE CHARACTERISTIC CURVE FOR HIGH POWER OPERATION

TRANSMISSION SYSTEM FOR WORK VEHICLE

TECHNICAL FIELD

The invention relates to a transmission system mainly mounted on a work vehicle such as a bulldozer and agricultural tractor and more particularly to a transmission system for a work vehicle having a function of mitigating shocks caused by speed changes.

BACKGROUND ART

Taking bulldozers for example, vehicles equipped with a power train designed to directly transmit the output of the engine to the transmission (gear shifter) through a main clutch (the vehicles of this type are hereinafter referred to as "direct-drive vehicles") have superior power transmission efficiency, but require the operator driving skill of a certain level for effective operation because the load imposed on the vehicle needs to be controlled by operating the implement or the gear shifter. In contrast with this, vehicles equipped with a power train designed to transmit the output of the engine to the transmission through a torque converter (the vehicles of this type are hereinafter referred to as "torque-flow vehicles") exert tenacious power during high load operation and enable easy gear shifting manipulation, but has inferior transmission efficiency and cannot carry out impactive rebating that is possible for the direct-drive vehicles.

There have been known torque-flow vehicles equipped with a lock-up system that make up for the functional shortcomings of the power trains of the vehicles of both types described above. In the torque-flow vehicles equipped with a lock-up system, a lock-up mode and a torque-converting mode are automatically selected according to the work load. In the lock-up mode, the lock-up clutch of the torque converter is actuated thereby directly transmitting the output of the engine to the transmission without passing through the torque converter. In the torque converting mode, the lock-up clutch is not actuated so that the output of the engine is transmitted to the transmission through the torque converter.

In the torque-flow vehicles equipped with a lock-up system, a speed change in the lock-up mode is carried out in such a way that after the lock-up mode has been switched to the torque converting mode, a gear shift is effected in the torque converting mode and then, the torque converting mode is again switched to the lock-up mode. As understood from the above, there exists a period during which the effective lock-up mode is not utilized. For further improving the efficiency of power transmission in the torque-flow vehicles equipped with a lock-up system, it is desirable to effect a gear shift in the lock-up mode without changing to the torque converting mode. However, when downshifting the transmission from a higher speed gear (e.g., second speed gear) to a lower speed gear (e.g., first speed gear), the rotational speed of the engine for the higher speed gear differs from the rotational speed of the engine for the lower speed gear at the shift point at which the driving performance (determined by the relationship between vehicle speed and tractive force) for the higher speed gear is equivalent to that for the lower speed gear, so that a change occurs in vehicle speed, leading to such a problem that the operator feels this change as a shock.

Many attempts have been made to solve the problem of such a shock caused by a speed change. For example, there has been proposed a technique (Japanese Patent Kokai Publication No. 5-229368) in which a shock caused by a speed change is alleviated by controlling the opening of the throttle so as to increase the rotational speed of the engine during the period from when a slip starts to occur in the friction clutch corresponding to the higher speed gear until when the friction clutch corresponding to the lower speed gear is perfectly engaged. According to another technique (Japanese Patent Kokai Publication No. 10-141487), a shock caused by a speed change is alleviated by controlling the pressure rising characteristics of the hydraulic friction clutch provided for each speed gear. There has been proposed still another technique (Japanese Patent Kokai Publication No. 2002-188713) according to which 24 speed ranges are offered by use of a Hi-Lo transmission, a primary transmission and a secondary transmission in combination and these transmissions are controlled so as to select a speed gear which provides a minimum speed difference at the time of gear shifting, whereby a shock caused by a speed change is mitigated.

The technique disclosed in Japanese Patent Kokai Publication No. 5-229368 has, however, proved to be unsuccessful in mitigating speed change shocks in bulldozers in which almost all operations are performed with the engine operating at full load (i.e., with the fuel throttle being in its full position), because this technique is intended for mitigation of speed change shocks in a driving condition where the engine is operated to output lower power than the output level of the full load operation (i.e., the operation with the fuel throttle fully opened). The technique disclosed in Japanese Patent Kokai Publication No. 10-141487 has also revealed a problem. Concretely, since this technique is designed to mitigate a speed change shock by moderating the degree of a gradual increase in hydraulic pressure working on a hydraulic friction clutch, the rise of driving torque is slow which causes a pause due to a torque shortage especially during high load operation. The technique associated with Japanese Patent Kokai Publication No. 2002-188713 presents the disadvantage of having a complex structure and control system.

The invention is directed to overcoming these problems and a primary object of the invention is therefore to provide a transmission system for a work vehicle, which is capable of reliably mitigating, with a comparatively simple arrangement, shocks caused by speed changes even in a work vehicle such as a bulldozer in which almost all operations are performed with the engine operating at full load.

DISCLOSURE OF THE INVENTION

The above object can be accomplished by a transmission system for a work vehicle according to the invention, which has a plurality of speed gears and a friction clutch provided for each speed gear and converts the output torque of an engine into torque according to work load by gear shifting operations performed through disengagement/engagement of the friction clutches;

the transmission system comprising friction clutch controlling means for controlling the disengagement/engagement of the friction clutches and engine controlling means for controlling the output of the engine;

wherein if a downshift from a higher speed gear to a lower speed gear, which is one of the gear shifting operations, is effected while the engine is operating at full load, the friction clutch controlling means allows the friction clutch corresponding to the higher speed gear to slide so as to enable power transmission and the engine controlling means allows the engine to perform high power operation during the sliding of the friction clutch.

In the invention, when executing a downshift from a higher speed gear to a lower speed gear, the friction clutch corresponding to the higher speed gear slides so as to enable power transmission and during the sliding of the friction clutch, the engine performs high power operation (overload operation). As a result, the driving force required for the work vehicle is supplied through a power transmission line which extends from the engine to the work vehicle through the higher speed gear, and the excessive output engine torque generated in the high power operation is used for increasing the rotational speed of the engine. According to the invention, when executing a shift from a higher speed gear to a lower speed gear, the rotational speed of the engine can be increased while supplying driving torque to the downstream driving wheels and others according to work load, so that a pause due to a shortage of driving torque can be avoided and, in consequence, a shock caused by a speed change during the downshift can be alleviated. It should be noted that the above-described effects can be achieved by controlling the friction clutches and the engine with the friction clutch controlling means and the engine controlling means respectively as described earlier, so that no complicated structure is involved.

The transmission system of the invention preferably includes engine rotational speed detecting means for detecting the rotational speed of the engine. If the rotational speed of the engine detected by the engine rotational speed detecting means reaches a matching rotational speed for the lower speed gear at a shift point after a start of high power operation, the friction clutch controlling means brings the friction clutch for the higher speed gear into a disengaged condition and the friction clutch for the lower speed gear into an engaged condition, while the engine controlling means switches the operation of the engine from the high power operation to the full load operation. Accordingly, by downshifting in such a way that the rotational speed of the engine is made equal to a matching rotational speed, that is, the engine rotational speed for the lower speed gear, at a shift point where the driving performance for the higher speed gear coincides with the driving performance for the lower speed gear, the higher speed gear can be more smoothly shifted to the lower speed gear, with the result that a shock caused by a speed change during the downshift can be further mitigated.

BRIEF DESCRIPTION OF THE DRAWINGS

FIG. 2 consisting of FIGS. 2(a), 2(b), 2(c), 2(d), 2(e), and 2(f), is a diagrammatical view illustrating various elements that constitute an input unit.

BEST MODE FOR CARRYING OUT THE INVENTION

Referring now to the accompanying drawings, a transmission system for a work vehicle will be concretely described according to a preferred embodiment of the invention. Note that this embodiment is associated with a case where the invention is applied to a bulldozer that serves as a work vehicle.

Figure 1:
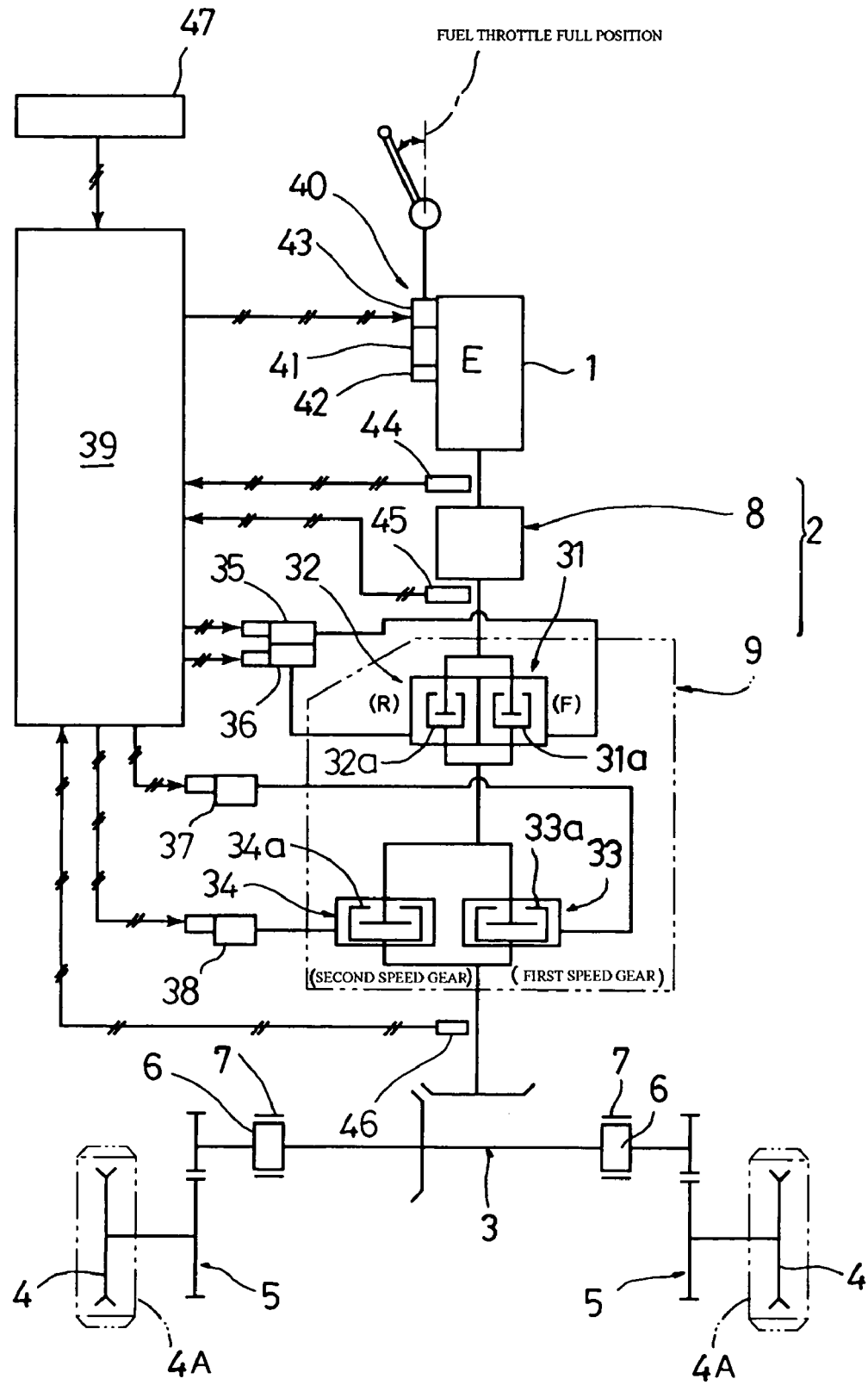
FIG. 1 is a block diagram of a transmission system according to an embodiment of the invention.

FIG. 1 shows a block diagram of the transmission system according to the embodiment of the invention. FIG. 2 shows a diagrammatical view illustrating various elements that constitute an input unit.

The bulldozer (hereinafter referred to as "vehicle") of this embodiment includes a tractor unit which is driven with such a mechanism that the output of a diesel engine (hereinafter referred to as "engine") is transmitted to right and left sprockets (driving wheels) through a power transmission to allow rotational movement of crawler belts which respectively mesh with the sprockets; a blade located in front of the tractor unit; and a ripper located behind the tractor unit (these members are not illustrated in the drawings). The driving force of the tractor unit is utilized to allow the blade to carry out leveling of the ground and dozing and allow the ripper to carry out crushing and earth excavation.

As shown in FIG. 1, the power transmission comprises a transmission system 2 for converting the output torque of the engine 1 to a torque according to the work load; a horizontal shaft device 3 for distributing the output of the transmission system 2 to the right and left sides; and a pair of final drives 5 for transmitting the output of the transmission system 2 which has been distributed to the right and left systems by the horizontal shaft device 3 to the crawler belts 4A through the right and left sprockets 4 respectively. Reference numerals 6 and 7 designate a steering clutch and a steering brake, respectively. By operating the steering clutch 6 and the steering brake 7, the power transmitted to the horizontal shaft device 3 is transmitted to either of the sprockets 4 and shut off from the other sprocket 4 so that the traveling direction of the vehicle can be changed.

The transmission system 2 has an input unit 8 for inputting power output from the engine 1 and a gear shifter unit 9 for forwarding the output of the input unit 8 to the horizontal shaft device 3 through a drive gear and a speed change gear (to be described later).

The input unit 8 is composed of elements which have been selected from a damper 10, a main clutch 11, a torque converter 12, a torque converter with a lock-up clutch 13, a torque divider 14 and an HMT (hydro-mechanical transmission) 15 which are shown in FIGS. 2(a) to 2(f), according to any one of the input unit constitution patterns A to F shown in Table 1.

TABLE 1

| INPUT UNIT CONSTITUTION PATTERN | ELEMENTS OF INPUT UNIT | | | | | | TYPE OF POWER TRAIN |
|---|---|---|---|---|---|---|---|
| | DAMPER | MAIN CLUTCH | TORQUE CONVERTER | TORQUE CONVERTER WITH LOCK-UP CLUTCH | TORQUE DIVIDER | HMT | |
| A | ○ | | | | | | HYDROSHIFTING VEHICLE |
| B | (○) | ○ | | | | | DIRECT-DRIVE VEHICLE |
| C | (○) | | ○ | | | | TORQUE-FLOW VEHICLE |
| D | (○) | | | ○ | | | TORQUE-FLOW VEHICLE WITH LOCK-UP SYSTEM |
| E | (○) | | | | ○ | | |
| F | (○) | | | | | ○ | HMT VEHICLE |

(NOTE 1)
Circle mark indicates an indispensable element selected for each constitution pattern and bracketed circle mark indicates an additional element which is not indispensable but suitably selected.
(NOTE 2)
In the column "type of power train", "direct-drive vehicle" means a vehicle designed to directly transmit the output of the engine to the transmission through a main clutch, and "torque-flow vehicle" means a vehicle designed to transmit the output of the engine to the transmission through a torque converter. "Hydroshifting vehicle" means a vehicle designed to transmitthe output of the engine to the transmission through a damper, and "HMT vehicle" means a vehicle in which the output of the engine is divided into two and one is directly transmitted to the transmission while the other being indirectly transmitted to the transmission through a hydraulic pump and a hydraulic motor.

Herein, the damper 10 includes a driver plate 16, a torsion spring 17, a hub 18 and others, and functions to mitigate oscillation caused by the engine 1 and impulsive force occurring in the power line. The main clutch 11 transmits power by utilizing friction force generated when a circular plate (clutch plate) 19 disposed on the driving side and having outer teeth on its outer circumference is pressed against a circular plate (clutch disc) 20 disposed on the driven side and having inner teeth on its inner circumference. The torque converter 12 has a pump wheel 21, a turbine wheel 22 and a stator wheel 23 and carries out power transmission by converting a mechanical energy into a hydrokinetic energy to amplify torque. The torque converter with a lock-up clutch 13 is formed by adding a lock-up clutch 24 to the torque converter 12 described above, and designed such that, for compensating for a power loss in the torque converter 12, the lock-up clutch 24 connects the pump wheel 21 to the turbine wheel 22 to mechanically directly transmit power within the speed region which does not require the characteristics of the torque converter 12. The torque converter with a lock-up clutch 13 is provided with a stator clutch 25 for freeing the stator wheel 23 in association with the operation (engagement) of the lock-up clutch 24. The torque divider 14 is designed to directly transmit a part of the power input to a torque converter section 26 to the downstream by a planetary gear train 27. The HMT guides one of the two portions into which the output of the engine has been divided by the input unit to the planetary gear train 28 directly, while guiding the other portion to the planetary gear train 28 through a variable displacement hydraulic pump 29 and a hydraulic motor 30, and then combines these output portions in the planetary gear train 28 to output as a combined power to the downstream.

The gear shifter unit 9 is a transmission which provides six forward speeds and six reverse speeds and is composed of a plurality of gear sets (e.g., parallel gear trains or planetary gear trains) not shown in the drawings. Concretely, the gear shifter unit 9 has forward and reverse drive gears 31, 32; a first speed gear 33; a second speed gear 34; and three to six speed gears (not shown). Through engagement and disengagement of friction clutches 31a, 32a, 33a and 34a which correspond to the drive gears 31, 32 and the speed gears 33, 34, the drive gears 31, 32 and the speed gears 33, 34 are switched to select one of their combinations. Although a detailed explanation on the friction clutches 31a, 32a, 33a and 34a is skipped herein, each friction clutch has clutch discs and clutch plates which are alternately disposed together with a clutch spring and a clutch piston within a clutch housing. In each friction clutch, if a pressure equal to or higher than a specified pressure (holding pressure) is applied to the clutch piston to which power is being applied, the alternately arranged clutch discs and clutch plates are pressed against one another to transmit the power (i.e., the friction clutch engagement condition). If the hydraulic pressure applied to the friction clutch decreases below the holding pressure, the friction clutch slides while transmitting the power (i.e., the friction clutch sliding condition). If the applied hydraulic pressure further decreases, the transmission of the power is stopped (i.e., the friction clutch disengagement condition).

Each of the friction clutches 31a, 32a, 33a and 34a is provided with an electric control type modulation valve (hereinafter referred to as "ECMV") 35 (36, 37 or 38) for controlling the flow rate and pressure of operating oil to be supplied to the friction clutch 31a (32a, 33a or 34a). The ECMVs 35, 36, 37, 38 each has a flow rate detector valve and an electromagnetic proportional pressure control valve (both valves are not shown) in combination. Each ECMV allows operating oil to flow in response to a trigger current from a controller 39 to fill the friction clutch 31a (32a, 33a or 34a). As long as the operating oil flows, the ECMV promotes rapid filling of the friction clutch 31a (32a, 33a or 34a) with the operating oil, and when the friction clutch 31a (32a, 33a or 34a) becomes full of the operating oil, the controller 39 releases a command current to the ECMV to control the hydraulic pressure to be supplied to the friction clutch 31a (32a, 33a or 34a). It should be noted that the arrangement including the controller 39 and ECMVs 37, 38 corresponds to "the friction clutch controlling means" of the invention.

The engine 1 is provided with a fuel injection system 40 which is composed of a fuel injection pump 41, a timer 42 and an electric control type governor (hereinafter referred to as "governor") 43. The fuel injection pump 41 includes a pressure-introducing mechanism for pressure-introducing fuel into a fuel injection nozzle and an injection quantity controlling mechanism for controlling the amount (injection quantity) of the fuel introduced by the pressure-introducing mechanism. The timer 42 controls injection timing according to the rotational speed of the engine 1. The governor 43 controls the operation of the injection quantity controlling mechanism and the timing control performed by the timer 42 to control the rotational speed of the engine 1 and fuel injection quantity according to the load.

The rated power of the engine 1 is determined in the light of constraints such as combustion efficiency, mechanical strength and heat balance, and based on the rated power thus determined, the upper limit of fuel injection quantity (the fuel throttle full position: See FIG. 1) is determined. In the present embodiment, an engine output torque characteristic (indicated by solid line $T_A$ in FIG. 5) for the full load operation during which the engine 1 is operated with the fuel throttle being located at its full position is mapped and stored in the controller 39. The controller 39 performs comparison operation in which the engine output torque characteristic map for the full load operation (hereinafter referred to as "full load engine map") is compared to information on the current conditions such as the rotational speed of the engine 1, the operating position of the injection quantity controlling mechanism and the timing control performed by the timer, thereby obtaining a deviation value, and outputs a control signal to the governor 43 of the fuel injection system 40 so as to reduce the deviation value. In the present embodiment, an engine output torque characteristic (indicated by broken line $T_B$ in FIG. 5) for the high power operation (overload operation) which is higher than the engine torque characteristic for the full load operation is mapped and stored in the controller 39. The controller 39 outputs a control signal to the governor 43 for allowing the fuel injection system 40 to inject a higher amount of fuel than the upper limit of fuel injection quantity determined based on the rated power, in order that output torque based on the engine torque characteristic map for the high power operation (hereinafter referred to as "high power engine map") is generated. It should be noted that the arrangement including the controller 39 and the fuel injection system 40 corresponds to "the engine controlling means" of the invention.

Input to the controller 39 are detection signals from an engine rotational speed sensor (engine rotational speed detecting means) 44 for detecting the rotational speed of the engine 1; a T/M input shaft rotational speed sensor 45 for detecting the rotational speed of the input shaft of the gear shifter unit 9; a T/M output shaft rotational speed sensor 46 for detecting the rotational speed of the output shaft of the gear shifter unit 9; a vehicle speed sensor 47 and others.

Figure 3:
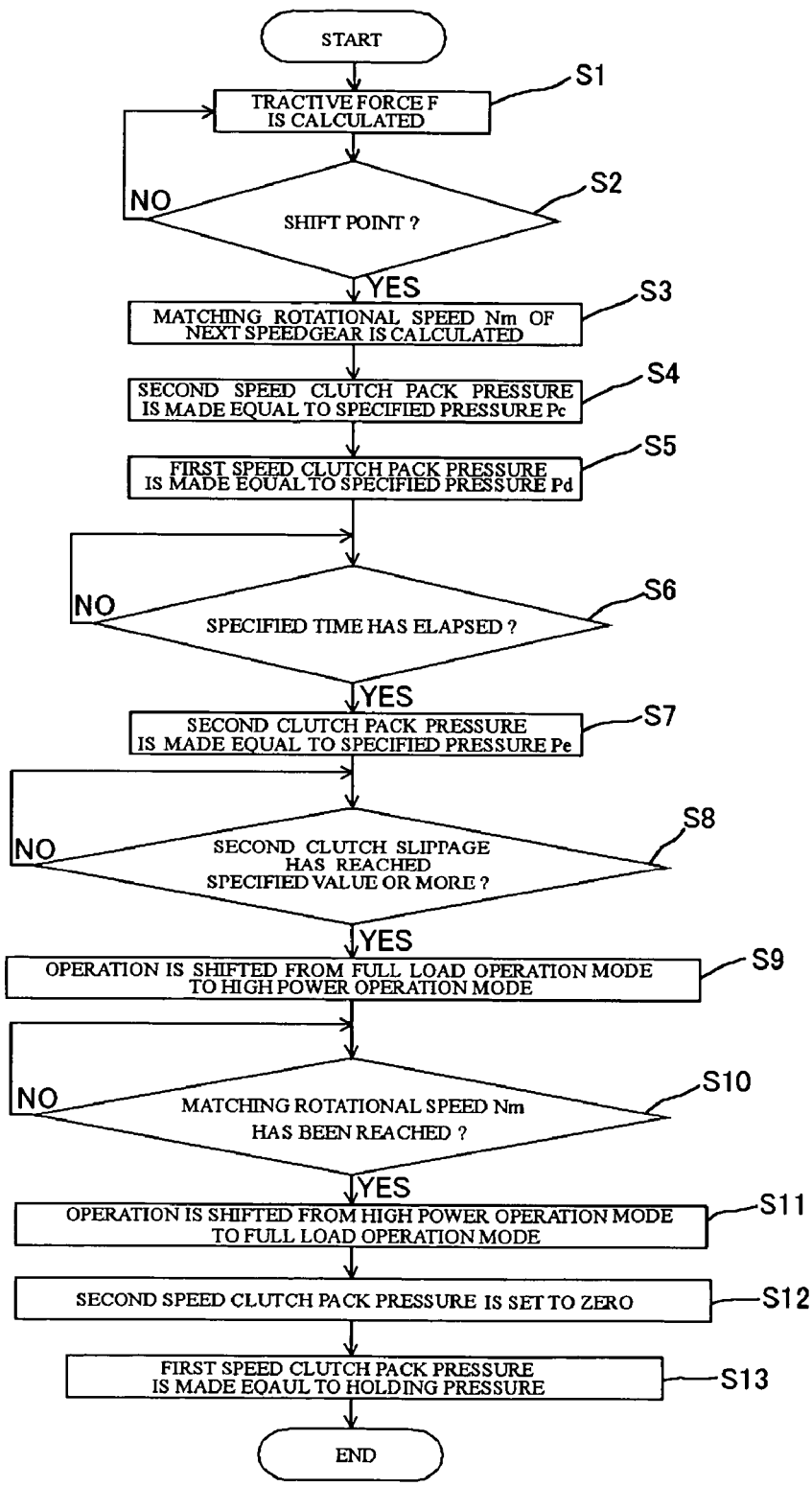
FIG. 3 is a flow chart of the content of processing performed according to a speed change shock mitigation program.
Figure 4:
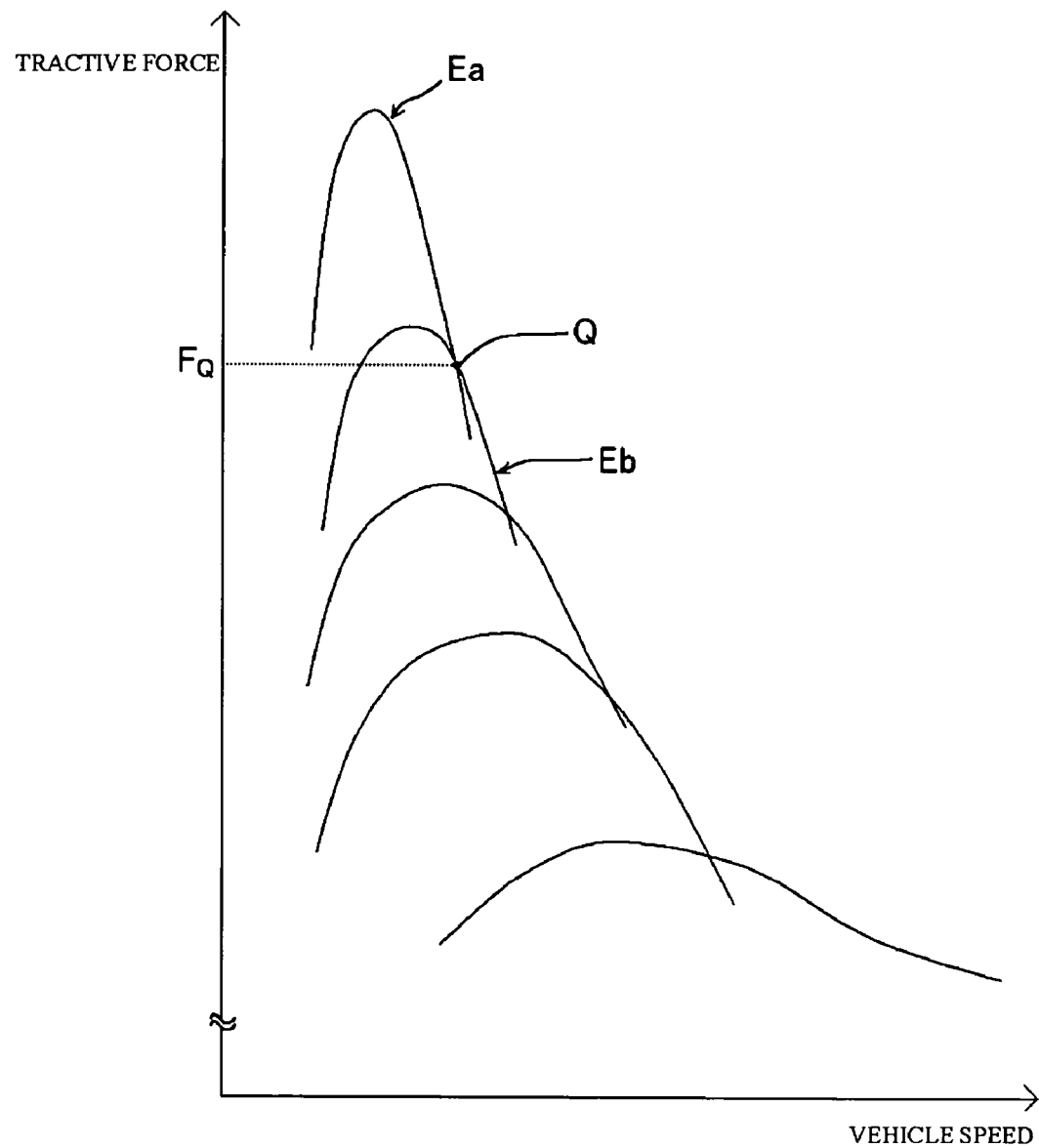
FIG. 4 is a driving performance characteristic diagram.
Figure 5:
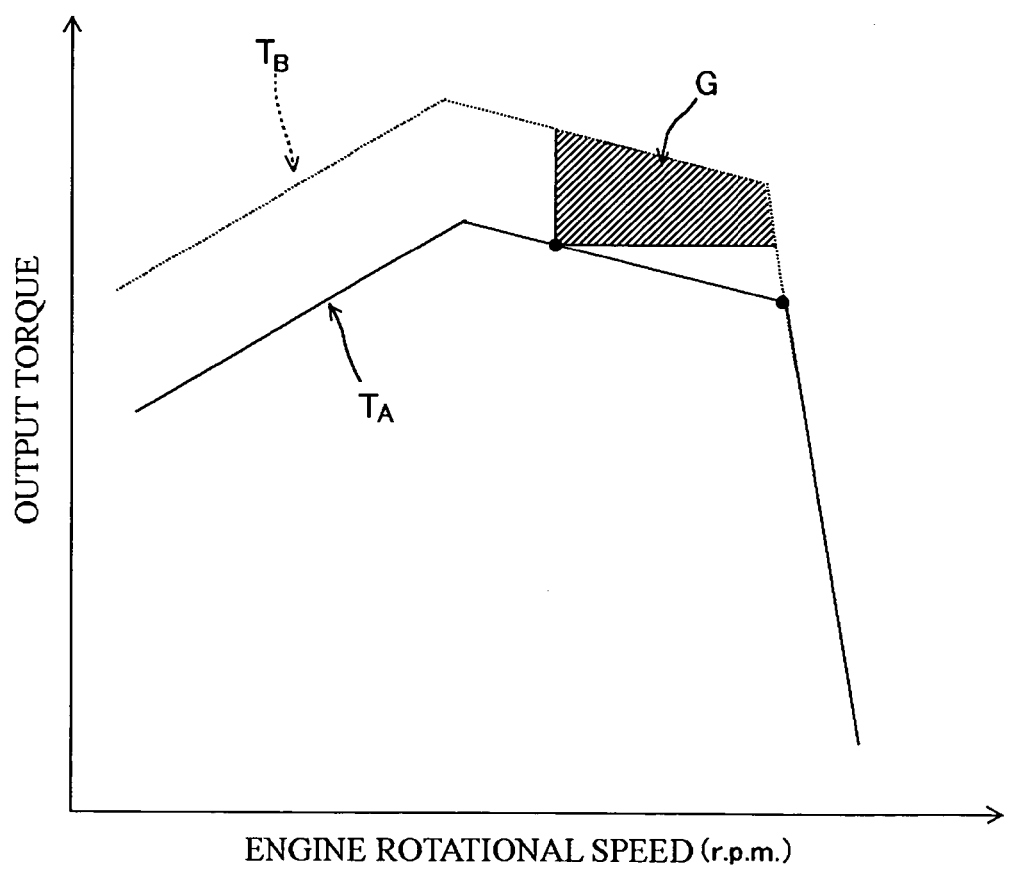
FIG. 5 is an engine output torque characteristic diagram.
Figure 6:
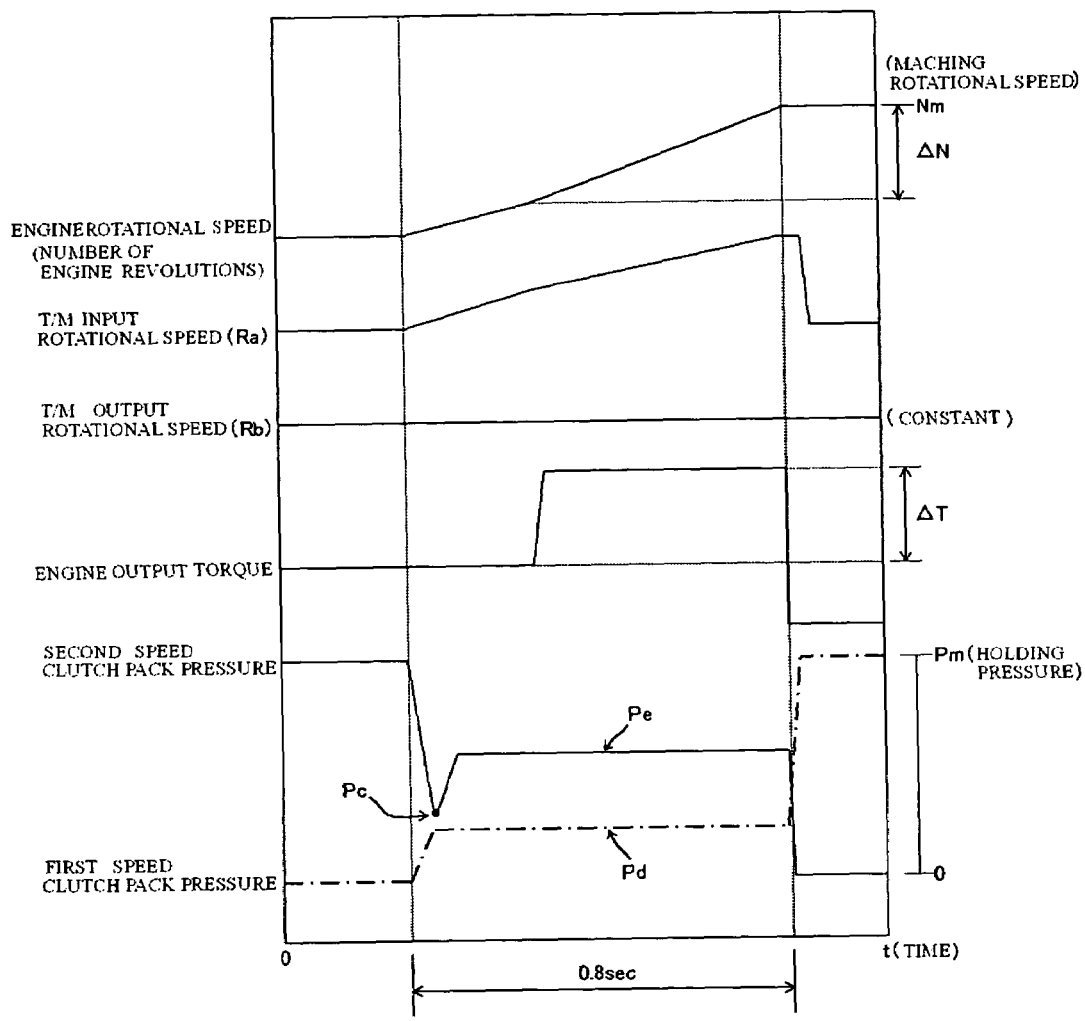
FIG. 6 is a timing chart of a downshifting operation.

Next, there will be explained the content of processing executed according to a speed change shock mitigation program stored in the controller 39. FIG. 3 shows a flow chart of the content of the processing performed according to the speed change shock mitigation program. FIGS. 4, 5 and 6 show a driving performance characteristic diagram, an engine output torque characteristic diagram, and a timing chart of a downshifting operation, respectively. The following description is associated with a case where downshifting to the first speed gear 33 (lower speed gear) is effected while carrying out dozing by the full load operation of the engine 1 with the forward drive gear 31 and the second speed gear (higher speed gear) 34 being engaged. In the following description, "the first speed (or second speed) clutch pack pressure" means the hydraulic pressure to be applied to the friction clutch 33a (34a) for the first (second) speed gear 33 (34). In FIG. 3, symbol S designates a step.

By starting the speed change shock mitigation program, a tractive force F is calculated from the output of the engine 1 and a vehicle speed detected by the vehicle speed sensor 47 (S1). A check is made to determine whether the tractive force F calculated in Step S1 is coincident with a tractive force $F_Q$ at a shift point Q at which the driving performance for the second speed gear 34 coincides with the driving performance for the first speed gear 33, that is, whether the present driving performance is on the shift point Q (S2). It should be noted that, in FIG. 4, the shift point Q is represented by the intersection of the driving performance curve for the first speed gear indicated by symbol Ea and the driving performance curve for the second speed gear indicated by symbol Eb. If it is determined in Step S2 that the current driving performance is on the shift point Q, an engine rotational speed Nm for the first speed gear 33 at the shift point Q, that is, a target engine rotational speed for effecting a smooth shift to the first speed gear 33 (hereinafter referred to as "matching rotational speed Nm") is calculated (S3). The driving performance is determined by the relationship between tractive force and vehicle speed and is stored beforehand in the form of a map in the controller 39.

Then, a second speed clutch pack pressure is once rapidly dropped from a holding pressure Pm to a specified pressure Pc as shown in FIG. 6 (S4), thereby causing a slip of the friction clutch 34a. Thereafter, hydraulic pressure is allowed to slightly act on the friction clutch 33a for the first speed gear 33 whereby the friction clutch 33a is brought into a sliding contact condition with a first speed clutch pack pressure being set to a specified pressure Pd (S5). After an elapse of a specified time (S6), the second speed clutch pack pressure is slightly raised from Pc to a specified pressure Pe (S7), thereby sliding the friction clutch 34a for the second speed gear 34 so as to continue power transmission. It is then determined from the difference between the T/M output rotational speed Rb and the T/M input rotational speed Ra whether the slippage of the friction clutch 34a for the second speed gear 34 has become equal to or more than a specified amount (S8). If it is determined that the slippage has become equal to or more than a specified amount, the operation of the engine 1 is switched from a full load operation mode corresponding to the full load engine map to a high power operation mode corresponding to the high power engine map (S9). Therefore, the engine output torque required for the vehicle is supplied to the vehicle, and since the engine output torque necessary for the vehicle during the very short shifting time (about 0.8 (sec) in this embodiment) is substantially constant, a rise ΔT in the output torque caused by the high power operation of the engine 1 (See FIG. 6) is used for increasing the rotational speed of the engine 1 (ΔN: See FIG. 6). It should be noted that hatched portion G in FIG. 5 represents the torque used for acceleration of the rotation of the engine 1.

A check is then made to determine whether the rotational speed of the engine 1 detected by the engine rotational speed sensor 44 has reached the matching rotational speed Nm calculated in Step S3 (S10). If it is determined that the engine rotational speed has reached the matching rotational speed Nm, the engine 1 is switched from the high power operation mode to the full load operation mode (S11), and at the same time, the second speed clutch pack pressure is made to be zero (S12) while making the first speed clutch pack pressure equal to the holding pressure Pm (S13). In this way, the downshifting operation is completed.

According to the present embodiment, since the rotational speed of the engine 1 can be raised to the matching rotational speed Nm for the lower speed gear while supplying the driving torque necessary for dozing to the downstream sprockets 4 during downshifting, a pause due to a shortage of torque can be prevented, thereby significantly mitigating a shock caused by a shift. In addition, such an effect can be attained by a relatively simple structure and control system.

Although the present invention has been discussed with a case where a downshift from the second speed gear 34 to the first speed gear 33 is effected while the forward drive gear 31 is being engaged, the same effect as that of the present embodiment can be achieved by a downshift from the third speed gear to the second speed gear 34 with the forward drive gear 31 being engaged as well as a downshift to each speed gear with the reverse drive gear 32 being engaged.

While the present invention has been presented with a case where the invention is applied to a bulldozer, the invention is not limited to this, but applicable to other work vehicles such as agricultural tractors which travel with the engine operating at full load.

What is claimed is:

1. A transmission system for a work vehicle having a plurality of speed gears and a friction clutch provided for each speed gear and converting the output torque of an engine into torque according to work load by gear shifting operations performed through disengagement/engagement of the friction clutches comprising:

friction clutch controlling means for controlling the disengagement/engagement of the friction clutches; and
    engine controlling means for controlling the output of the engine in a full load operation mode and a high power operation mode, and said full load operation mode set for a rated power of the engine, and said high power operation mode set for a power higher than the rated power of the engine;
    wherein if a downshift from a higher speed gear to a lower speed gear, which is one of said gear shifting operations, is effected while the engine operating in said full load operation mode, the friction clutch controlling means causes the friction clutch corresponding to the higher speed gear to slide so as to enable power transmission and the engine controlling means causes the engine to perform in said high power operation mode during the sliding of the friction clutch.

2. The transmission system for a work vehicle according to claim 1, further comprising engine rotational speed detecting means for detecting the rotational speed of the engine,
    wherein if the rotational speed of the engine detected by the engine rotational speed detecting means reaches a matching rotational speed for the lower speed gear at a shift point after a start of high power operation, the friction clutch controlling means brings the friction clutch for the higher speed gear into a disengaged condition and the friction clutch for the lower speed gear into an engaged condition, while the engine controlling means switches the operation of the engine from the high power operation to the full load operation.

3. A transmission system for a work vehicle, comprising:

a plurality of speed gears and a friction clutch provided for each speed gear converting the output torque of an engine into torque according to work load by gear shifting operations performed through disengagement/engagement of the friction clutches responsive to operating fluid;
    a plurality of electric control type modulation valves (ECMV's) respectively associated with said friction clutches for controlling the flow rate pressure of operating fluid for each of the friction clutches;
    a controller storing a full load engine map representative of an engine output map for said engine stored in said controller for a full fuel throttle position and a high power engine map representative of an engine output higher than the engine output of the full load engine map, and comparing current engine conditions for outputting a signal representative of a deviation value between current engine conditions and the full load engine map or the high power engine map, and outputting a trigger signal for controlling said ECMV's; and
    a fuel injection system for injecting a higher amount of fuel than an upper limit of fuel injection defined by said full load engine map corresponding to said high power engine map in the case that a downshift from a higher speed gear to a lower speed gear is effected while the engine is operating corresponding to the full load engine map and the friction clutch corresponding to the higher speed gear is sliding.

4. The transmission system as set forth in claim 3, wherein said fuel injection system includes a fuel injection pump, a timer, and governor responsive to said deviation value signal from said controller for controlling an injection quantity of fuel to said engine.

5. The transmission system as set forth in claim 3 wherein said controller is responsive at least to detection signals from an engine rotational speed sensor for detecting the rotational speed of the engine, an input shaft rotational speed sensor for detecting the rotation speed of an input shaft of a gear shifter unit; an output shaft rotation speed sensor for detecting the rotational speed of an output shaft of the gear shifter unit, and a vehicle speed sensor.

* * * * *